(12) United States Patent
Bish et al.

(10) Patent No.: US 6,477,628 B1
(45) Date of Patent: Nov. 5, 2002

(54) BACKUP COPY ACHIEVING IMPROVED EFFICIENCY BY WAITING UNTIL REWIND/UNLOAD COMMAND FOR BULK DATA COPY

(75) Inventors: Thomas William Bish; Kenneth Fairclough Day, III; Douglas William Dewey; Dean Lee Hanson; Mark A. Reid, all of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/493,599

(22) Filed: Jan. 28, 2000

(51) Int. Cl.[7] ............................................. G06F 12/00
(52) U.S. Cl. ........................ 711/162; 711/154; 714/6
(58) Field of Search ........................... 711/111, 4, 161, 711/162; 714/5–6

(56) References Cited

U.S. PATENT DOCUMENTS

| | | | |
|---|---|---|---|
| 5,485,321 A | 1/1996 | Leonhardt et al. | 360/48 |
| 5,574,950 A | 11/1996 | Hathorn et al. | 710/8 |
| 5,592,618 A | 1/1997 | Micka et al. | 714/54 |
| 5,615,329 A | 3/1997 | Kern et al. | 714/6 |
| 5,734,818 A | 3/1998 | Kern et al. | 714/20 |
| 5,870,537 A | 2/1999 | Kern et al. | 714/6 |
| 5,875,481 A | 2/1999 | Ashton et al. | 711/165 |
| 5,943,688 A * | 8/1999 | Fisher et al. | 711/162 |
| 6,035,412 A * | 3/2000 | Tamer et al. | 714/6 |
| 6,148,383 A * | 11/2000 | Micka et al. | 711/162 |
| 6,199,146 B1 * | 3/2001 | Pence | 711/154 |

* cited by examiner

Primary Examiner—Do Hyun Yoo
Assistant Examiner—Nasser Moazzami
(74) Attorney, Agent, or Firm—Dan Hubert & Assoc.

(57) ABSTRACT

A particularly efficient storage system makes redundant copies of data on tape by waiting until a rewind/unload command is received and then copying stored data objects en masse, thereby benefitting from any data compression used to store the objects along with the lower overhead for the copy operation. This copy operation is more efficient than the data objects' original storage, because there is less overhead in copying the data objects en masse; also, there is less data to copy if the data objects were stored with any data compression. Efficiency may be further increased by dividing the task of originally writing the data objects between paired tape drives, and then exchanging data objects between the tape drives upon issuance of the rewind/unload command.

25 Claims, 5 Drawing Sheets

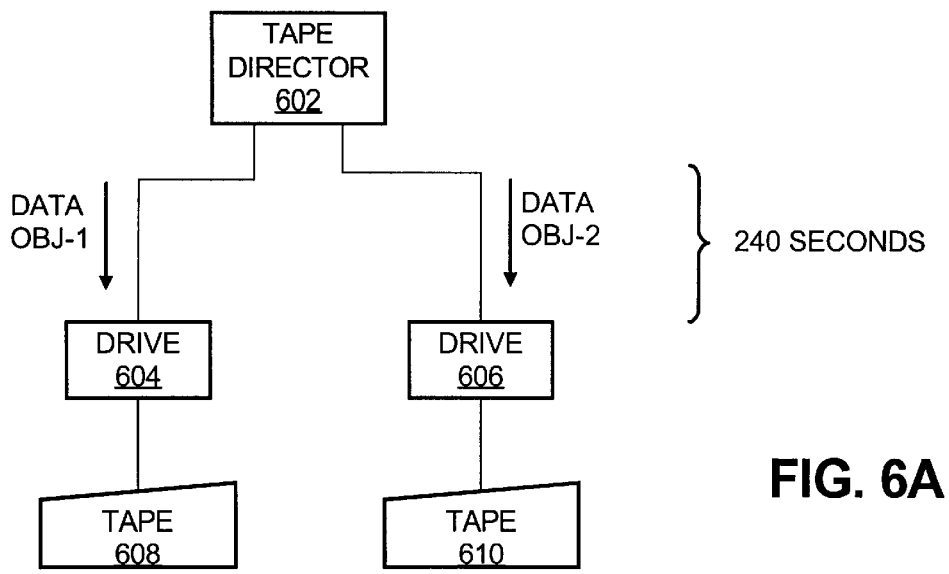
FIG. 6A
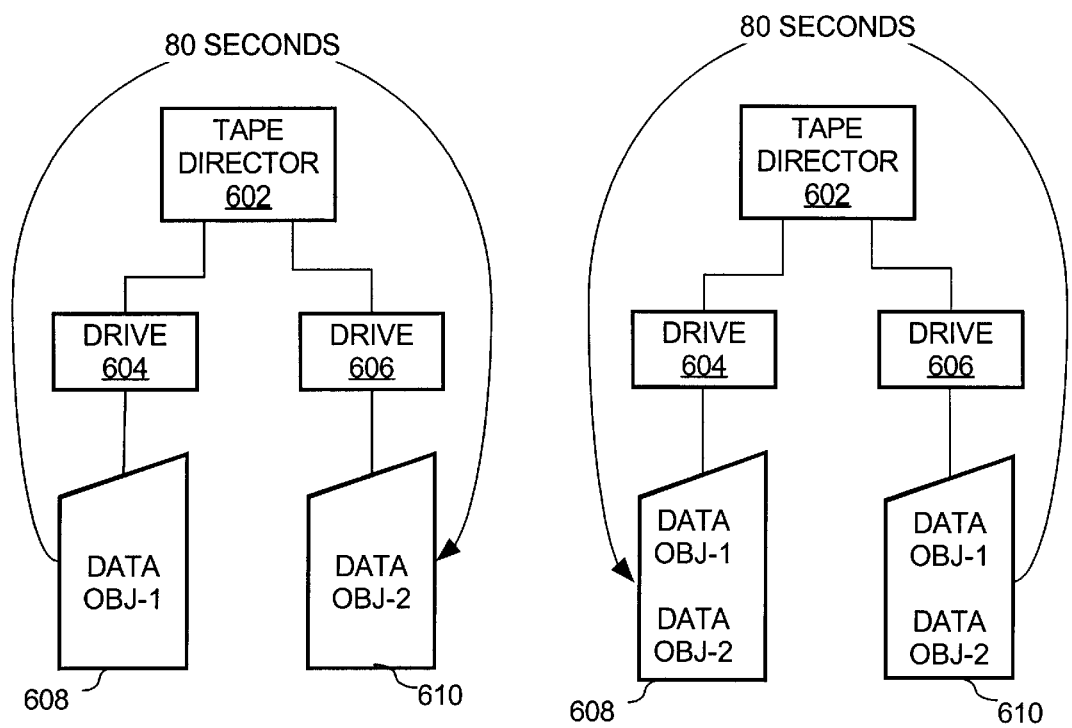
FIG. 6B  FIG. 6C

BACKUP COPY ACHIEVING IMPROVED EFFICIENCY BY WAITING UNTIL REWIND/UNLOAD COMMAND FOR BULK DATA COPY

BACKGROUND OF THE INVENTION

1. Field of the Invention

The present invention relates to techniques for digitally storing data. More particularly, the invention concerns a particularly efficient storage system for making redundant copies of data on tape by waiting until a rewind/unload command is received and then copying stored data objects en masse, thus benefitting from any data compression used to store the objects along with the lower overhead for the bulk copy operation.

2. Description of the Related Art

Many data processing systems require a large amount of data storage space, for use in efficiently accessing, modifying, and re-storing data. Data storage is typically separated into several different levels, each level exhibiting a different data access time or data storage cost. A first, or highest level of data storage involves electronic memory, usually dynamic or static random access memory (DRAM or SRAM). Electronic memories take the form of semiconductor integrated circuits where millions of bytes of data can be stored on each circuit, with access to such bytes of data measured in nanoseconds. The electronic memory provides the fastest access to data since access is entirely electronic.

A second level of data storage usually involves direct access storage devices (DASD). DASD storage, for example, includes magnetic and/or optical disks. Data bits are stored as micrometer-sized magnetically or optically altered spots on a disk surface, representing the "ones" and "zeros" that comprise the binary value of the data bits. Magnetic DASD includes one or more disks that are coated with remnant magnetic material. The disks are rotatably mounted within a protected environment. Each disk is divided into many concentric tracks, or closely spaced circles. The data is stored serially, bit by bit, along each track. An access mechanism, known as a head disk assembly (HDA) typically includes one or more read/write heads, and is provided in each DASD for moving across the tracks to transfer the data to and from the surface of the disks as the disks are rotated past the read/write heads. DASDs can store gigabytes of data, and the access to such data is typically measured in milliseconds (orders of magnitudes slower than electronic memory). Access to data stored on DASD is slower than electronic memory due to the need to physically position the disk and HDA to the desired data storage location.

A third or lower level of data storage includes tapes, tape libraries, and optical disk libraries. Access to library data is much slower than electronic or DASD storage because a robot is necessary to select and load the needed data storage medium. An advantage of these storage systems is the reduced cost for very large data storage capabilities, on the order of Terabytes of data. Tape storage is often used for backup purposes. That is, data stored at the higher levels of data storage hierarchy is reproduced for safe keeping on magnetic tape. Access to data stored on tape and/or in a library is presently on the order of seconds.

Having a backup data copy is mandatory for many businesses for which data loss would be catastrophic. The time required to recover lost data is also an important recovery consideration. In this respect, tape or library backup has been found useful for periodically backing up primary data by making a copy of the primary data. In contrast to the serial access of tape storage, DASD backup storage is random access and therefore facilitates more advanced backup techniques. One example is "dual copy," which operates by mirroring contents of a primary DASD device with a nearly identical secondary DASD device. An example of dual copy involves providing additional DASDs so that data is written to the additional DASDs substantially in real time along with the primary DASDs. Then, if the primary DASDs fail, the secondary DASDs can be used to provide otherwise lost data. A drawback to this approach is that the number of required DASDs is doubled.

A different data backup alternative that avoids the need to provide double the storage devices involves writing data to a redundant array of inexpensive devices (RAID). In this configuration, the data is apportioned among many DASDs. If a single DASD fails, then the lost data can be recovered by applying error correction procedures to the remaining data. Several different RAID configurations are available.

A number of other solutions have been developed for DASD backups, including synchronous remote copy, asynchronous remote dual copy, peer-to-peer remote copy, and other solutions, many having been developed by International Business Machines Corp. (IBM).

DASD backup solutions have been more thoroughly developed than tape backup solutions. Due to ability to randomly access DASD media, DASD offers more reliable storage, faster commit times, and more flexibility in crafting backup strategies. Still, tape backup remains popular because it is cost effective. According to one approach, when a system receives new data for storage, it concurrently copies the data to separate tapes using tape drives operating in parallel. Under still another approach, when the system receives new data for storage, it first copies the data using tape drive, and then begins to copy the data from the first tape drive to another tape at a second tape drive.

Although known tape backup strategies enjoy widespread use today, engineers at IBM are continually seeking to improve the performance and efficiency of tape backup systems. One area of possible focus is reducing the time required to complete tape backups.

SUMMARY OF THE INVENTION

Broadly, the present invention concerns a particularly efficient storage system for making redundant copies of data on tape media. The invention is implemented in a tape storage system that includes a tape director coupled to one or more tape drives, the entire tape storage system being coupled to a host. In response to a write command, the invention automatically makes redundant copies of the data, this process being invisible to the host.

Initially, the host sends the tape director one or more data objects, such as logical "volumes" of data. The host also sends corresponding instructions to write the data objects to tape media. In response, the tape director stores the data objects using a first tape drive, and then transmits a message to the host signaling successful completion of the storage. The tape director waits until receiving a rewind/unload command from the host to create a backup copy of the data objects. At this time, the tape director creates the backup copy by copying all data from the first tape drive to a second tape drive, regardless of the data objects' boundaries. This copy operation, called "bulk copy," is more efficient than the data objects' original storage, because there is less overhead in copying the data objects en masse, and there is actually less data to copy if the data objects were stored with any data compression. After copying the data objects, the tape director completes the host request by instructing the tape drive to rewind and unload the tape containing the original data objects.

The invention also contemplates a "dual tape" modification to this technique, where the tape directory stores some data objects using one tape drive, while storing other data objects using another tape drive. When the host sends the tape director its rewind/unload command, the tape director responds by directing the tape drives to exchange their respective data objects, thereby creating the backup copy. Namely, the tape director operates the tape drives to all data objects from the backup set of tapes to the primary set of tapes, and to copy all data objects from the primary set of tapes to the backup set of tapes. After copying these data objects, the tape director commands the tape drives to rewind the primary and backup tapes and unload the tapes from their respective tape drives.

In one embodiment, the invention may be implemented to provide a method to create redundant data copies on tape media. In another embodiment, the invention may be implemented to provide an apparatus, such as a tape storage system, programmed or otherwise configured to create redundant copies of data on tape by waiting until a rewind/unload command is received and then copying stored data objects en masse, thus taking advantage of any data compression used to store the objects and also the lower overhead for the copy operation. In still another embodiment, the invention may be implemented to provide a signal-bearing medium tangibly embodying a program of machine-readable instructions executable by a digital data processing apparatus to direct components of a tape storage system to create redundant data copies on tape media as mentioned above.

The invention affords its users with a number of distinct advantages. First, in contrast to previous techniques, the tape backup process of this invention finishes more quickly. This is because the tape director delays creation of the backup copy until the host issues a "rewind-and-unload" command. This delayed backup completes more quickly because it takes advantage of any data compression used to store the objects, and also benefits from the bulk copy operation's low overhead. Overhead is low because the bulk copy operation involves transferring a large block of information, rather than many smaller data objects as such.

Furthermore, the present invention does not incur any additional delay that is detectable by the host. This is because most conventional backup systems do not commit a backup copy until the rewind-and-unload operation succeeds, even though the conventional backup has been performed previously. The invention may be implemented to gain further advantage by dividing the initial storage of data objects among paired tape drives, and then cooperatively operating the tape drives to exchange data upon the rewind/unload command. The tape drives, operating in parallel, operate twice as fast. As another advantage, the invention permits earlier recovery than prior tape backup techniques; the data is available upon completion of the first copy, even if the backup copy has not been made. The invention also provides a number of other advantages and benefits, which should be apparent from the following description of the invention.

BRIEF DESCRIPTION OF THE DRAWINGS

FIGS. 6A–6C are block diagrams showing a tape storage system in various stages of backing up data according to the invention.

DETAILED DESCRIPTION

The nature, objectives, and advantages of the invention will become more apparent to those skilled in the art after considering the following detailed description in connection with the accompanying drawings. As mentioned above, the invention concerns a tape backup system configured to perform a particularly expedited tape backup.

Hardware Components & Interconnections

Introduction

Figure 1:
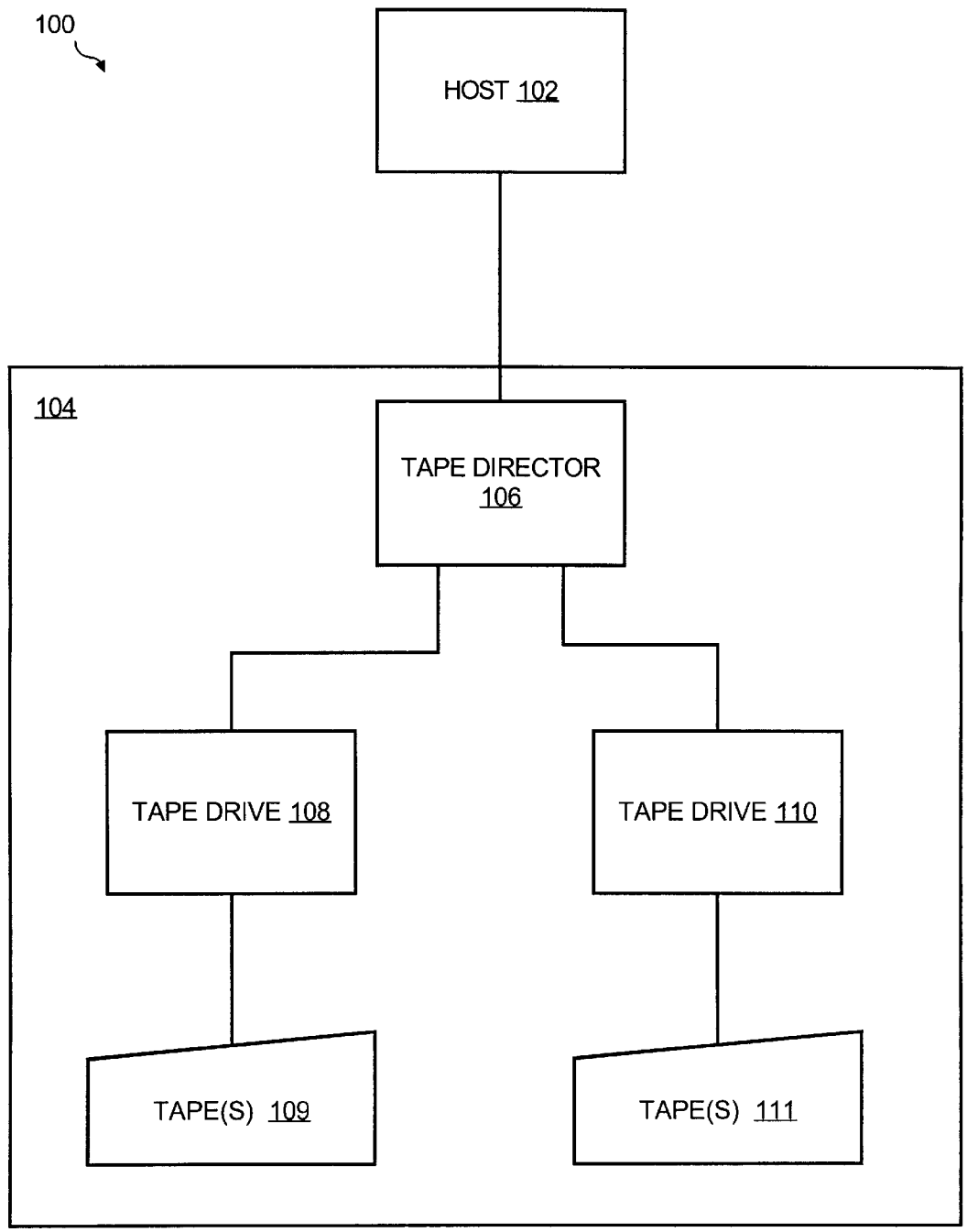
FIG. 1 is a block diagram of the hardware components and interconnections of a tape backup system according to the invention.

One aspect of the invention concerns a tape storage system, which may be embodied by various hardware components and interconnections as shown by the arrangement 100 of FIG. 1. Generally, the tape storage system 104 stores and retrieves data to/from tape media in accordance with commands received from a host 102.

Host

The host 102 manages the system 104 by transmitting commands to the system 104 to store and retrieve data therefrom. The host 102 may be implemented in a variety of different ways, such as one or more mainframe computers, computer workstations, personal computers, or even a human operator that interacts with the tape storage system 104 by an interface such as a keyboard and display monitor. To provide some particular examples, the host 102 may be implemented by an IBM System/390 computer utilizing the MVS operating system, an IBM model RS 6000 machine, IBM model AS 400 computer, IBM 3090 mainframe computer, or another suitable digital data processing machine.

Tape Storage System

The tape storage system 104 includes a tape director 106, one or more tape drives (exemplified by the two illustrated tape drives 108, 110), and corresponding tape media (exemplified by the two illustrated tapes 109, 111). The system 104 may be implemented by interconnecting components as shown, or by designating part of a larger tape library for use as discussed herein. The tape director 106 comprises a digital computer that manages the tape drives 108, 110 according to commands from the host 102. As an example, the tape director 106 may be implemented by a tape system controller from an IBM model 3590 tape storage system.

The tape drives 108, 110 comprise mechanisms for exchanging machine-readable data with the tapes 109, 111. The tape drives 108, 110 may be implemented by tape drives of the IBM model 3590 tape storage system, as an example. Although magnetic tapes are shown by example, the tapes 109, 110 may be implemented by any serially accessible, removable data storage media, whether implemented in "tape" format or not. One example of suitable tapes includes IBM 3590 tape cartridges. The tapes 109, 110 are loaded into the tape drives 108, 110 for access by the tape drives, and may be unloaded or "ejected" from the tape drives for the purpose of storing the tapes and freeing the tape drives to access other tapes.

Digital Data Processing Apparatus

As mentioned above, the tape director 106 is implemented by a digital computer. In this respect, another aspect of the invention concerns such a digital data processing apparatus programmed or otherwise configured to implement the tape director 106. This apparatus may be embodied by various hardware components and interconnections; one example is the digital data processing apparatus 200 of FIG. 2. The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise random access memory (RAM), and may be used to store the programming instructions executed by the processor 202. The nonvolatile storage 208 may comprise, for example, one or more magnetic data storage disks such as a "hard drive," a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

Logic Circuitry

In contrast to the digital data storage apparatus discussed previously, a different embodiment of the invention implements the tape director 106 with logic circuitry instead of computer-executed instructions. Depending upon the particular requirements of the application in the areas of speed, expense, tooling costs, and the like, this logic may be implemented by constructing an application specific integrated circuit (ASIC) having thousands of tiny integrated transistors. Such an ASIC may be implemented using CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), and the like.

Operation

In addition to the various hardware embodiments described above, a different aspect of the invention concerns a particularly efficient storage system for making redundant copies of data on tape media. This is achieved by waiting until a rewind/unload command is received and then copying stored data objects en masse, thus taking advantage of any data compression used to store the objects and also the lower overhead for the bulk copy operation.

Signal-Bearing Media

Figure 2:
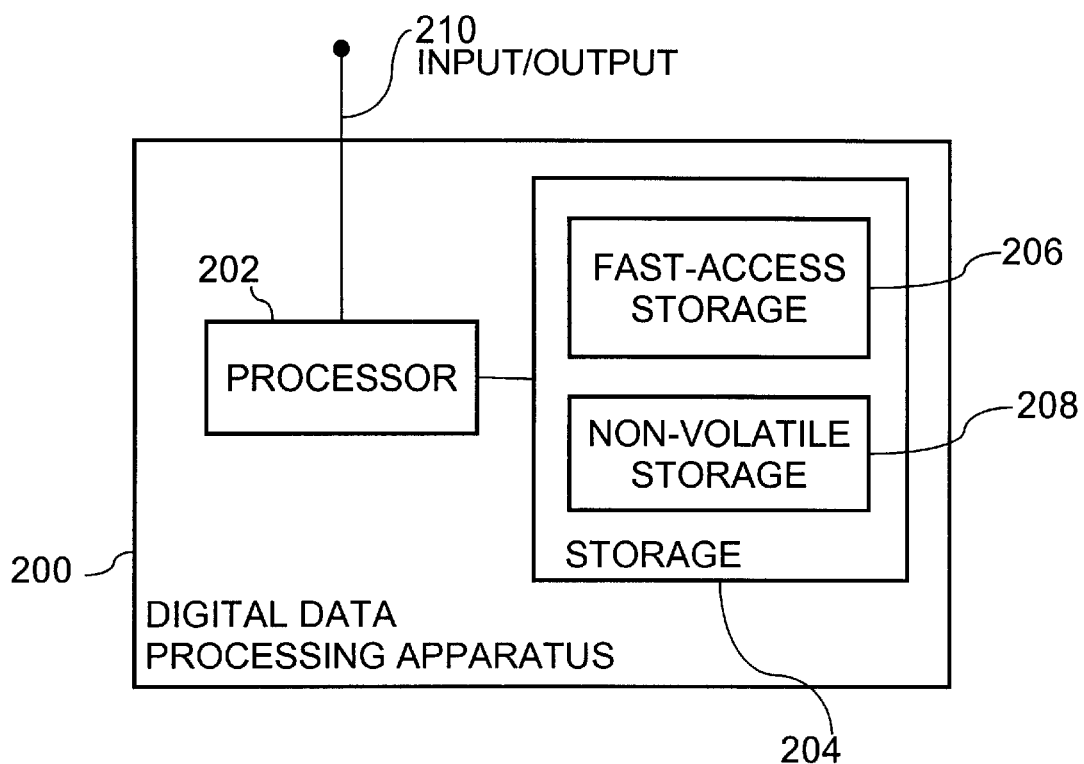
FIG. 2 is a block diagram of a digital data processing machine according to the invention.

In the context of FIGS. 1–2, such a method may be implemented, for example, by operating the tape director 106, as embodied by a digital data processing apparatus 200, to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to make redundant copies of data on tape by waiting until a rewind/unload command is received and then copying stored data objects en masse, thus taking advantage of any data compression used to store the objects and also the lower overhead for the bulk copy operation.

Figure 3:
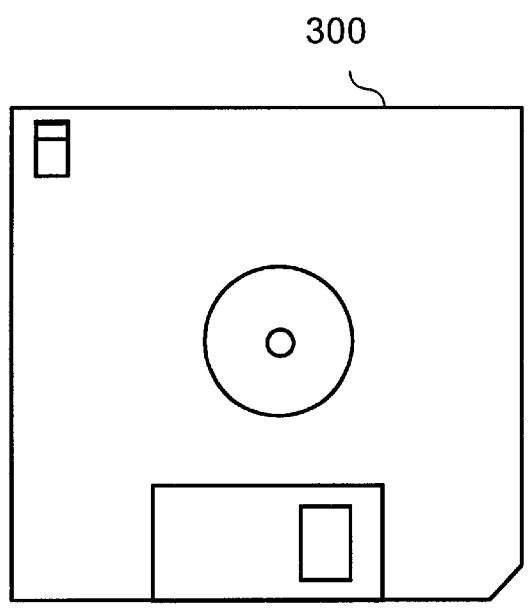
FIG. 3 shows an exemplary signal-bearing medium in accordance with the invention.

This signal-bearing media may comprise, for example, RAM (not shown) contained within the storage 204, as represented by the fast-access storage 206 for example. Alternatively, the instructions may be contained in another signal-bearing media, such as a magnetic data storage diskette 300 (FIG. 3), directly or indirectly accessible by the processor 200. Whether contained in the storage 204, diskette 300, or elsewhere, the instructions may be stored on a variety of machine-readable data storage media, such as direct access storage (e.g., a conventional "hard drive," redundant array of inexpensive disks (RAID), or another direct access storage device (DASD)), magnetic tape, electronic read-only memory (e.g., ROM, EPROM, or EEPROM), optical storage (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C," etc.

Overall Sequence of Operation

Introduction

Figure 4:
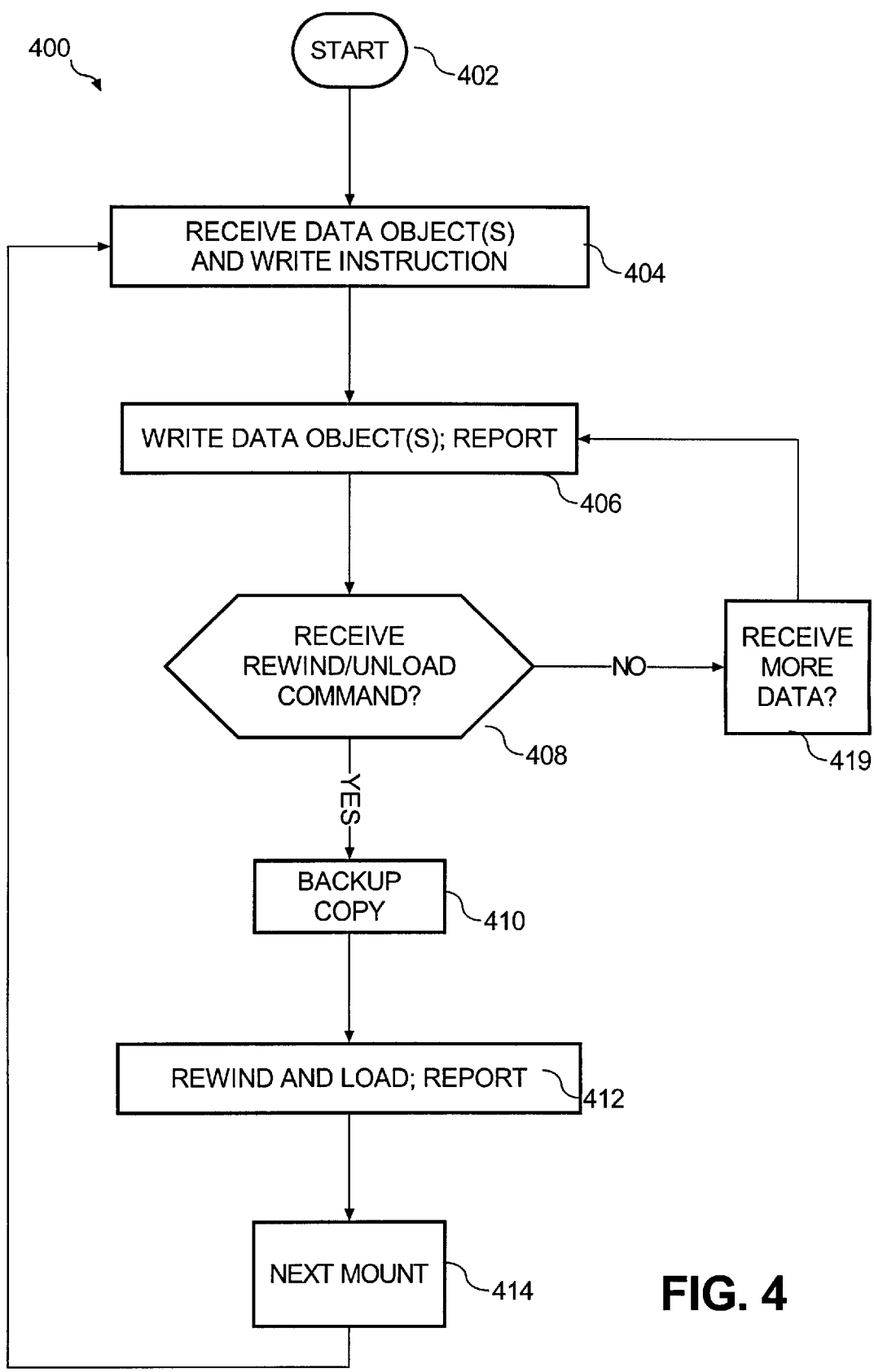
FIG. 4 is a flowchart of an expedited tape backup sequence according to the invention.

FIG. 4 shows a sequence 400 to illustrate one example of the method aspect of the present invention. For ease of explanation, but without any intended limitation, the example of FIG. 4 is described in the context of the tape storage system 104 described above.

Receiving Data Objects & Write Instruction

After the steps 400 are initiated in step 402, the tape director 106 receives data objects and one or more corresponding write instructions from the host 102 in step 404. The host's write instructions comprise commands to store the data objects on a single tape. A "data object" may comprise any convenient unit of data, such as a logical volume, file, record, page, byte, block, etc.

Writing Data Objects

In step 406 the tape director 106 instructs the tape drive 108 to store the data object(s) received in step 404. Although the tape drive 108 is used as one example, the tape drive 110 may be used instead. Optionally, the tape director 106 may apply a data compression technique when storing the data objects to occupy less space on the tape 109. One exemplary data compression technique is "LZ1." When the write operation completes, the tape director 106 transmits a suitable message, such as "write successful" to the host 102.

Dual Tape

As explained below, one alternative to step 406 is to perform "dual tape" storage. This operation pairs data objects provided by the host for storage 102, and saves time by concurrently storing the data objects using separate tape drives. The tape director 106 may pair two data objects according to order of receipt, logical relationship of the underlying data, characteristics of the data, etc.

With dual tape storage, step 406 involves the tape director 106 instructing the tape drives 108, 110 to concurrently store different data objects to the tapes 109, 110. Each of the two tape drives 108, 110 stores one data object. When both tape drives' write operations succeed, the tape director 106 transmits a suitable message, such as "write successful" to the host 102. Since dual tape storage is performed in spite of the host's command to store the data objects together on the same tape medium, it is therefore conducted so as to be invisible to the host 102.

Rewind/Unload

After writing the data object(s), the tape director 106 determines whether it has received a "rewind-and-unload" command from the host 102 (step 408). This command, which may also be referred to by other names, is a host command for the system 104 to rewind the presently loaded tape medium. In the absence of a rewind-and-unload command, the system 104 proceeds to receive more data (step 419) and write the data objects (step 406) to the currently loaded tape(s) 109 and/or 110.

Although not illustrated, the system 104 may receive data objects (step 419) asynchronously relative to the writing of data objects step (step 406). For example, data objects may be received at a faster rate than they are written out to tape. In this event, data objects are received and accumulated in a queue.

If the optional dual tape storage feature is implemented, the tape director 106 limits the amount of data written to each tape to half of the tape's capacity. As the tapes 109, 111 fill with data in parallel, room must be reserved to copy the other tape's contents and thereby form a backup copy, as discussed in step 410 below. When the tapes 109, 111 approach half-full, the tape director 106 may send an appropriate "tape full" message to the host 102, from which the host 102 may eventually respond by issuing a rewind-and-unload command. Alternatively, the host 102 may issue status queries to the tape director 106 to monitor the progress of filling the tapes, and preemptively issue the rewind-and-unload command at the appropriate time.

High Efficiency Data Exchange—Single Tape

Step 408 determines whether the host has issued a rewind-and-unload command. When the host 102 finally does send the rewind-and-unload command, the tape director 106 does not immediately respond by rewinding and unloading the tape because the backup copy has not been created yet. Instead, the tape director in step 410 initiates a "bulk copy" operation to produce a high efficiency data exchange. The bulk copy operation, which may involve a single command issued to the tape drive 108, results in copying of the data objects en masse. Generally, the bulk copy operation treats the stored data objects as a single, larger data object. Therefore, there is less overhead incurred by copying the data objects together than the process of copying them individually, as was performed in step 406.

More particularly, the bulk copy operation (step 410) involves the following sub steps. First, the tape director 106 copies all of the data on the current tape 109 into volatile memory accessible to the tape director 106. This step effectively groups many smaller data objects on the tape 109 to form a single, large data object. The tape director 106 ignores "records" or other data boundaries utilized by the host 102. Instead, the tape director 106 copies all of the tape's individual data units (such as "logical blocks" or other units), regardless of whether they contain metadata utilized by the tape director 106, metadata compatible with the tape drive 108, or customer data. The copying of data in this manner also takes advantage of any compression that has been applied to stored customer data, since this data occupies less space and is therefore faster to copy. After the contents of the tape 109 are copied into the tape directors volatile memory, the tape director 106 directs the drive 110 to write the data back out "en masse" to the tape 111. If desired, the tape director 106 may start writing to the tape 111 before reading all data from the tape 109, in effect buffering and spooling the data transfer rather than waiting until all data has arrived at the tape director 106. Furthermore, the data may be written out instead to a different tape (not shown) coupled to the drive 108. The operation of writing this data enjoys particular efficiency because underlying data is written free from any constraints of records or other host-compatible data boundaries.

High Efficiency Data Exchange—Dual Tape

In the dual tape storage embodiment, step 410 involves each tape drive 108, 110 cooperatively copying its data objects to the other tape drive's tape medium. Since the tape drives cannot concurrently read and write, this is a sequential process. One tape drive reads while the other writes, and then vice versa. Respective reading and writing operations among the tape drives may be interleaved if desired.

This process is highly efficient for various reasons. Unlike data received from the host 102 for storage in the system 104, the stored data objects are already configured in tape format, and therefore expeditiously copied from one tape drive to the other. Additionally, the data objects may be stored with some compression, further boosting the data transfer efficiency. Thus, the copying of stored data objects from one tape drive to another is conducted with the highest efficiency of which the system 104 is capable.

The performance of step 410 is invisible to the host 102. From the host perspective, the host sends the rewind-and-unload command and then waits for a message from the tape director 106 signaling successful completion of the operation.

Rewind & Unload

Following step 410, the tape director 106 directs the tape drives 108, 110 to satisfy the host's rewind/unload command (step 408) by performing a rewind-and-unload operation (step 412). In response, the tape drives rewind and then eject their respective tapes. The tape drives may also place the ejected tapes in a designated place, such as a transient tape bin or slot, input/output slot, pass-through slot, etc. As an example, the tape director 106 may wait until both tape drives' rewind-and-unload operations are complete, and then send the host 102 a message to that effect. Having finished step 412, the tape storage system 104 then proceeds to mount new any tapes (step 414), and the process begins anew (step 404).

Comparison by Example

To more thoroughly explain the operation of this invention, a specific comparative example is provided below in the context of "dual tape" storage. This example is given to compare a conventional tape backup with the backup of this invention. In this example, the tape system receives two data objects of 2400 Mb size, and an accompanying write instruction. While storing data, the tape drives inherently apply 3:1 compression. Thus, when each 2400 Mb data object is stored on tape, it occupies 800 Mb. Each tape drive stores data at the rate of 10 Mb/second.

Conventional Backup

Figure 5A:
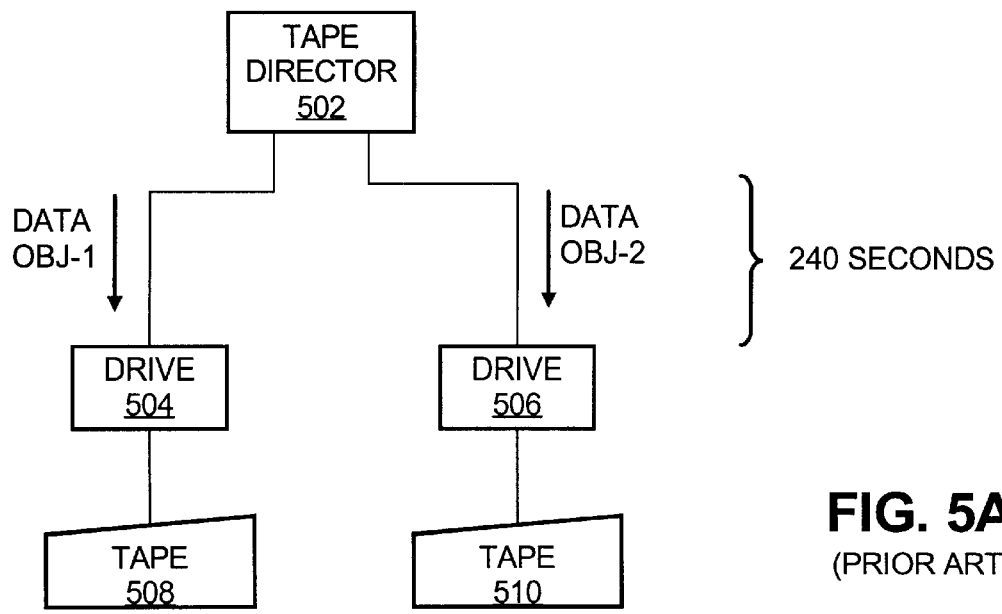
FIGS. 5A–5B are block diagrams showing a conventional tape storage system in various stages of performing a conventional data backup.
Figure 5B:
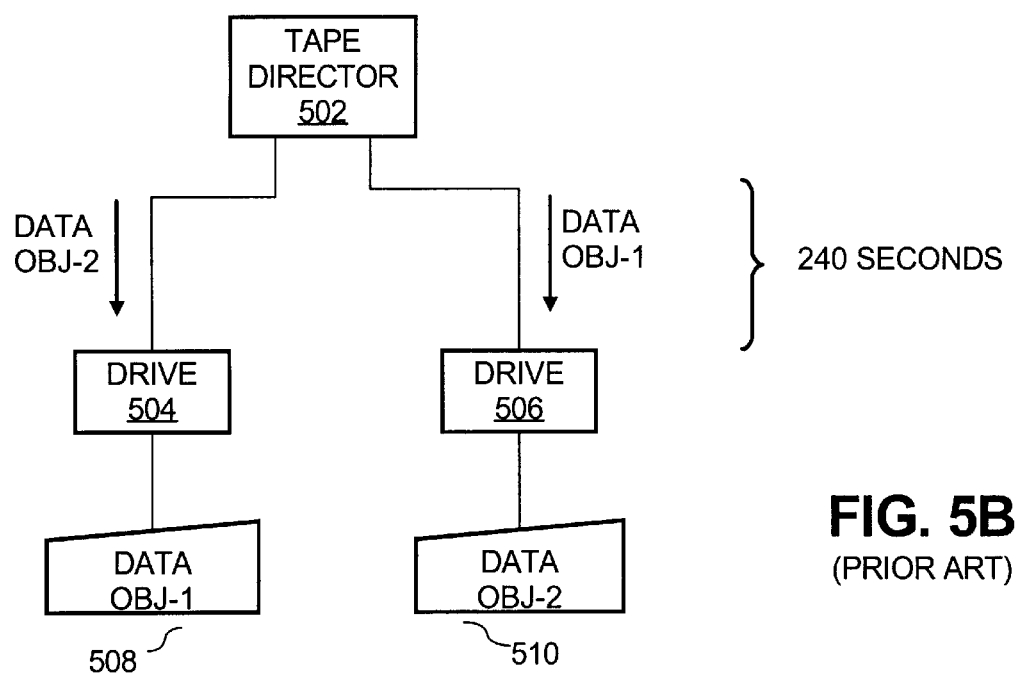

The conventional backup sequence is diagrammatically shown by FIGS. 5A–5B. In FIG. 5A, the tape director 502 directs the tape drive 504 to store the first data object to a tape 508, and the tape drive 506 to store the second data object to its tape 510. The tape drives can operate in parallel, so this operation takes 240 seconds (i.e., 2400 Mb data object written at 10 Mb/second).

Next, in FIG. 5B, the tape director 502 directs the tape drive 504 to store the second data object on the tape 508, while the tape drive 506 stores the first data object on the tape 510. As with the operation of FIG. 5A, this takes another 240 seconds. The overall time of completing the operations of FIGS. 5A–5B is 480 seconds.

Efficient Backup According to This Invention

The backup sequence of the present invention is shown by FIGS. 6A–6C. In FIG. 6A, the tape director 602 directs the tape drive 604 to store the first data object on its tape 608, and the tape drive 606 to store the second data object on its tape 610. Since the tape drives can operate in parallel, so this operation takes 240 seconds (i.e., 2400 Mb data object written at 10 Mb/second). its tape 606, and the tape drive 606 to store the second data object on its tape 610. Since the tape drives can operate in parallel, so this operation takes 240 seconds (i.e., 2400 Mb data object written at 10 Mb/second).

Next, in FIG. 6B, the tape director 602 directs the tape drives 604, 606 to cooperatively copy the first data object from the tape 608 to the tape 610. Since the first data object was compressed to 800 Mb when initially stored by the tape drive 604, the operation of FIG. 6B takes 80 seconds (i.e., 800 Mb data object copied at 10 Mb/second).

Next, in FIG. 6C, the tape director 602 directs the tape drives 604, 606 to cooperatively copy the second data object from the tape 610 to the tape 608. This operation, like that of FIG. 6B, requires 80 seconds. The overall time of completing the operations of FIGS. 6A–6C is 400 seconds, an improvement of twenty percent over the 480 seconds required by the conventional technique of FIGS. 5A–5B.

Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A method of operating a tape storage system to create redundant copies of data on tape media, comprising the operations of:

from a host, the tape storage system receiving multiple data objects and corresponding instructions to store the data objects in the tape storage system;

storing the data objects on a first tape medium and transmitting one or more messages to the host signaling successful completion of the storage operations; and waiting until the tape storage system receives a rewind/unload command from the host, and then performing a bulk copy operation to copy the stored data objects from the first tape medium to a second tape medium.

2. The method of claim 1, where the bulk copy operation comprises:

copying contents of the first tape medium in aggregate into a buffer; and copying contents of the buffer in aggregate the second tape medium.

3. A method of operating a data storage system to create redundant copies of data on tape media, comprising the operations of:

from a host, the data storage system receiving multiple data objects and instructions to store the data objects on a first tape in the data storage system;

pairing the data objects, storing each data object of a pair on a different tape, and transmitting a message to the host reporting successful completion of the storage operation; and waiting until the data storage system receives a rewind/unload command from the host and then creating a backup copy by copying each stored data object to the tape containing its paired object.

4. The method of claim 3, where the message to the host reports successful storage of the data objects upon the first tape.

5. The method of claim 3, the operations further comprising:

in response to the rewind/unload command, the data storage system waiting for successful creation of the backup copy and then proceeding to rewind and unload the tapes.

6. A method of operating a tape storage system to create redundant copies of data on tape, the tape storage system including a tape director coupled to two or more tape drives, the tape storage system being coupled to a host, the method comprising the operations of:

the tape director receiving multiple data objects including at least first and second data objects, and also receiving host instructions to write the data objects to tape media in the data storage system; and in response to receiving the instructions, automatically storing redundant copies of the first and second data objects on tape media by performing operations comprising:

the tape director performing an initial storage operation comprising operations of concurrently (1) operating the first tape drive to write the first data object to a primary set of one or more tapes and (2) operating the second tape drive to write the second data object to a backup set of one or more tapes;

the tape director receiving a rewind/unload command from the host, and in response, the tape director performing operations comprising:

directing the tape drives to copy the second data object from the backup set of tapes to the primary set of tapes, and also directing the tape drives to copy the first data object from the primary set of tapes to the backup set of tapes; and after copying the first and second data objects, directing the tape drives to rewind the tapes of the primary and backup sets and unload the tapes of the primary and backup sets from their respective tape drives.

7. The method of claim 6, where:

the operations further include, upon successful completion of the initial storage operation, sending a message reporting successful completion of the write operation to the host.

8. The method of claim 6, the operations further comprising:

upon successful completion of the operations of rewinding and unloading the primary and backup sets, the tape director sending a message reporting successful completion of the rewind/unload operation to the host.

9. A method of operating a tape storage system to create redundant copies of data on tape, the tape storage system including a tape director coupled to two or more tape drives, the tape storage system being coupled to a host, the method comprising the operations of:

the tape director receiving multiple data objects including at least first and second data objects, and also receiving host instructions to write the data objects to tape media in the data storage system; and in response to receiving the instruction, automatically storing redundant copies of the first and second data objects on tape media by performing operations comprising:

the tape director performing an initial storage operation comprising operations of concurrently (1) operating the first tape drive to write the first data object to a primary set of one or more tapes and (2) operating the second tape drive to write the second data object to a backup set of one or more tapes;

the tape director receiving a rewind/unload command from the host, and in response, the tape director performing operations comprising:

directing the tape drives to copy the second data object from the backup set of tapes to the primary set of tapes, and also directing the tape drives to copy the first data object from the primary set of tapes to the backup set of tapes;

after copying the first and second data objects, directing the tape drives to rewind the tapes of the primary and backup sets and unload the tapes of the primary and backup sets from their respective tape drives;

the tape storage system experiencing a storage error after the initial storage operation but before directing the tape drives to rewind and unload the tapes; and in response to the error, retrieving the first and second data objects from the tapes.

10. A signal-bearing medium tangibly embodying a program of machine-readable instructions executable by a digital processing apparatus to perform a method of operating a data storage system to create redundant copies of data on tape media, comprising the operations of:

from a host, the data storage system receiving multiple data objects and corresponding instructions to store the data objects in the data storage system;

storing the data objects on a first tape medium and transmitting one or more messages to the host signaling successful completion of the storage operations; and waiting until the storage system receives a rewind/unload command from the host, and then performing a bulk copy operation to copy the stored data objects from the first tape medium to a second tape medium.

11. The medium of claim 10, where:

copying contents of the first tape medium in aggregate into a buffer; and copying contents of the buffer in aggregate the second tape medium.

12. A signal-bearing medium tangibly embodying a program of machine-readable instructions executable by a digital processing apparatus to perform a method of operating a data storage system to create redundant copies of data on tape media, comprising the operations of:

from a host, the data storage system receiving multiple data objects and instructions to store the data objects on a first tape in the data storage system;

pairing the data objects, storing each data object of a pair on a different tape, and transmitting a message to the host reporting successful completion of the storage operation; and waiting until the data storage system receives a rewind/unload command from the host; and then creating a backup copy by copying each stored data object to the tape containing its paired object.

13. The medium of claim 12, where the message to the host reports successful storage of the data objects upon the first tape.

14. The medium of claim 12, the operations further comprising:

in response to the rewind/unload command, the data storage system waiting for successful creation of the backup copy and then proceeding to rewind and unload the tapes.

15. A signal-bearing medium tangibly embodying a program of machine-readable instructions executable by a digital processing apparatus to perform a method for operating a tape storage system to create redundant copies of data on tape, the tape storage system including a tape director coupled two or more tape drives, the tape storage system being coupled to a host, the method comprising the operations of:

the tape director receiving multiple data objects including at least first and second data objects, and also receiving host instructions to write the data objects to tape media in the data storage system; and in response to receiving the instructions, automatically storing redundant copies of the first and second data objects on tape media by performing operations comprising:

the tape director performing an initial storage operation comprising operations of concurrently (1) operating the first tape drive to write the first data object to a primary set of one or more tapes and (2) operating the second tape drive to write the second data object to a backup set of one or more tapes;

the tape director receiving a rewind/unload command from the host, and in response, the tape director performing operations comprising:

directing the tape drives to copy the second data object from the backup set of tapes to the primary set of tapes, and also directing the tape drives to copy the first data object from the primary set of tapes to the backup set of tapes; and after copying the first and second data objects, directing the tape drives to rewind the tapes of the primary and backup sets and unload the tapes of the primary and backup sets from their respective tape drives.

16. The medium of claim 15, where:

the operations further include, upon successful completion of the initial storage operation, sending a message reporting successful completion of the write operation to the host.

17. The medium of claim 15, the operations further comprising:

upon successful completion of the operations of rewinding and unloading the primary and backup sets, the tape director sending a message reporting successful completion of the rewind/unload operation to the host.

18. A signal-bearing medium tangibly embodying a program of machine-readable instructions executable by a digital processing apparatus to perform a method for operating a tape storage system to create redundant copies of data on tape, the tape storage system including a tape director coupled to two or more tape drives, the tape storage system being coupled to a host, the method comprising the operations of:

the tape director receiving multiple data objects including at least first and second data objects, and also receiving host instructions to write the data objects to tape media in the data storage system; and in response to receiving the instructions, automatically storing redundant copies of the first and second data objects on tape media by performing operations comprising:

the tape director performing an initial storage operation comprising operations of concurrently (1) operating the first tape drive to write the first data object to a primary set of one or more tapes and (2) operating the second tape drive to write the second data object to a backup set of one or more tapes;

the tape director receiving a rewind/unload command from the host, and in response, the tape director performing operations comprising:

directing the tape drives to copy the second data object from the backup set of tapes to the primary set of tapes, and also directing the tape drives to copy the first data object from the primary set of tapes to the backup set of tapes;

after copying the first and second data objects, directing the tape drives to rewind the tapes of the primary and backup sets and unload the tapes of the primary and backup sets from their respective tape drives;

the tape storage system experiencing a storage error after the initial storage operation but before directing the tape drives to rewind and unload the tapes; and in response to the error, retrieving the first and second data objects from the tapes.

19. A tape storage system, comprising:

one or more tape drives;

a tape director coupled to the tape drives and programmed to create redundant copies of data on tape media, comprising the operations of:

from a host, the tape director receiving multiple data objects and corresponding instructions to store the data objects in the tape storage system;

storing the data objects on a first tape medium and transmitting one or more messages to the host signaling successful completion of the storage operations; and waiting until the tape director receives a rewind/unload command from the host, and then performing a bulk copy operations to copy the stored data objects from the first tape medium to a second tape medium.

20. A data storage system, comprising:

at least two tape drives;

a tape director coupled to the tape drives and programmed to create redundant copies of data on tape media, comprising the operations of:

from a host, the tape director receiving multiple data objects and instructions to store the data objects on a first tape in the data storage system;

pairing the data objects, storing each data object of a pair on a different tape, and then transmitting a message to the host reporting successful completion of the storage operation; and waiting until the tape director receives a rewind/unload command from the host and then creating a backup copy by copying each stored data object to the tape containing its paired data object.

21. A data storage system, comprising:

at least two tape drives;

a tape director coupled to the tape drives and programmed to perform operations to create redundant copies of data on tape, the operations comprising:

the tape director receiving multiple data objects including at least first and second data objects, and also receiving host instructions to write the data objects to tape media in the data storage system; and in response to receiving the instruction, automatically storing redundant copies of the first and second data objects on tape media by performing operations comprising:

the tape director performing an initial storage operation comprising operations of concurrently (1) operating the first tape drive to write the first data object to a primary set of one or more tapes and (2) operating the second tape drive to write the second data object to a backup set of one or more tapes;

the tape director receiving a rewind/unload command from the host, and in response, the tape director performing operations comprising:

directing the tape drives to copy the second data object from the backup set of tapes to the primary set of tapes, and also directing the tape drives to copy the first data object from the primary set of tapes to the backup set of tapes; and after copying the first and second data objects, directing the tape drives to rewind the tapes of the primary and backup sets and unload the tapes of the primary and backup sets from their respective tape drives.

22. A method of operating a tape storage system to create redundant copies of data on tape media, comprising the operations of:

from a host, the tape storage system receiving multiple data objects and corresponding instructions to store the data objects in the tape storage system;

storing the data objects on a first removable tape medium and transmitting one or more messages to the host signaling successful completion of the storage operations; and performing the following operations responsive to a command from the host requesting at least one of following actions: tape rewind, tape unload:

performing a bulk copy operation to copy the stored data objects from the first tape medium to a second tape medium; and delaying the requested action until the stored data objects have been copied from the first tape medium.

23. A signal-bearing medium tangibly embodying a program of machine-readable instructions executable by a digital processing apparatus to perform a method of operating a data storage system to create redundant copies of data on tape media, comprising the operations of:

from a host, the tape storage system receiving multiple data objects and corresponding instructions to store the data objects in the tape storage system;

storing the data objects on a first removable tape medium and transmitting one or more messages to the host signaling successful completion of the storage operations; and performing the following operations responsive to a command from the host requesting at least one of following actions: tape rewind, tape unload:

performing a bulk copy operation to copy the stored data objects from the first tape medium to a second tape medium; and delaying the requested action until the stored data objects have been copied from the first tape medium.

24. A tape storage system, comprising:

one or more tape drives;

a tape director coupled to the tape drives and programmed to create redundant copies of data on tape media, comprising the operations of:
- from a host, receiving multiple data objects and corresponding instructions to store the data objects in the tape storage system;
- storing the data objects on a first removable tape medium and transmitting one or more messages to the host signaling successful completion of the storage operations; and
- performing the following operations responsive to a command from the host requesting at least one of following actions: tape rewind, tape unload:
  - performing a bulk copy operation to copy the stored data objects from the first tape medium to a second tape medium; and
  - delaying the requested action until the stored data objects have been copied from the first tape medium.

25. A tape storage system, comprising:

one or more tape drives;

tape director means for creating create redundant copies of data on tape media by:
- from a host, receiving multiple data objects and corresponding instructions to store the data objects in the tape storage system;
- storing the data objects on a first removable tape medium and transmitting one or more messages to the host signaling successful completion of the storage operations; and
- performing the following operations responsive to a command from the host requesting at least one of following actions: tape rewind, tape unload:
  - performing a bulk copy operation to copy the stored data objects from the first tape medium to a second tape medium; and
  - delaying the requested action until the stored data objects have been copied from the first tape medium.

* * * * *

UNITED STATES PATENT AND TRADEMARK OFFICE
CERTIFICATE OF CORRECTION

PATENT NO. : 6,477,628 B1  
DATED : November 5, 2002  
INVENTOR(S) : Bish et al.

It is certified that error appears in the above-identified patent and that said Letters Patent is hereby corrected as shown below:

Column 9,  
Line 12, delete "so".  
Lines 14-18, after "Mb/second).", delete: "its tape 606, and the tape drive 606 to store the second data object on its tape 610. Since the tape drives can operate in parallel, so this operation takes 240 seconds (i.e., 2400 Mb data object written at 10 M/b/second)."  
Line 60, insert -- to -- between "aggregate" and "the second".

Column 11,  
Line 50, insert -- to -- between "aggregate" and "the second".

Column 12,  
Line 15, insert -- to -- between "coupled" and "two or more".

Column 14,  
Lines 41 and 63, insert -- the -- between "at least one of" and "following".

Column 15,  
Line 17, insert -- the -- before "following actions".

Column 16,  
Line 3, delete "create" between "creating" and "redundant".  
Line 14, insert -- the -- before "following actions".

Signed and Sealed this

Eighteenth Day of March, 2003

JAMES E. ROGAN  
*Director of the United States Patent and Trademark Office*